(12) United States Patent
Pescatore

(10) Patent No.: US 7,415,551 B2
(45) Date of Patent: Aug. 19, 2008

(54) MULTI-HOST VIRTUAL BRIDGE INPUT-OUTPUT RESOURCE SWITCH

(75) Inventor: John C. Pescatore, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 10/643,032

(22) Filed: Aug. 18, 2003

(65) Prior Publication Data

US 2005/0044284 A1  Feb. 24, 2005

(51) Int. Cl.
*G06F 13/12* (2006.01)
(52) U.S. Cl. .............................. 710/62; 710/12; 709/212
(58) Field of Classification Search ...................... 710/1, 710/4, 7, 12, 62
See application file for complete search history.

(56) References Cited

U.S. PATENT DOCUMENTS

| 5,483,647 | A | | 1/1996 | Yu et al. ...................... 395/500 |
| 5,651,129 | A | | 7/1997 | Yokote et al. ................. 395/431 |
| 5,872,904 | A | * | 2/1999 | McMillen et al. ............... 714/4 |
| 6,006,264 | A | | 12/1999 | Colby et al. ................. 709/226 |
| 6,032,268 | A | * | 2/2000 | Swoboda et al. ............... 714/30 |
| 6,112,263 | A | * | 8/2000 | Futral ........................... 710/37 |
| 6,145,024 | A | * | 11/2000 | Maezawa et al. .............. 710/14 |
| 6,148,348 | A | * | 11/2000 | Garnett et al. ................. 710/14 |
| 6,389,120 | B1 | * | 5/2002 | Garland et al. ........... 379/93.01 |
| 6,421,711 | B1 | | 7/2002 | Blumenau et al. ........... 709/213 |
| 6,564,274 | B1 | * | 5/2003 | Heath et al. .................. 710/105 |
| 6,707,396 | B2 | * | 3/2004 | Govindaraman ............. 341/50 |
| 6,826,196 | B1 | * | 11/2004 | Lawrence ................... 370/466 |
| 2002/0172195 | A1 | * | 11/2002 | Pekkala et al. .............. 370/360 |
| 2003/0037224 | A1 | * | 2/2003 | Oehler et al. ................. 712/29 |
| 2003/0142674 | A1 | * | 7/2003 | Casey ......................... 370/393 |

* cited by examiner

*Primary Examiner*—Alford Kindred
*Assistant Examiner*—Eron J Sorrell
(74) *Attorney, Agent, or Firm*—Baker Botts L.L.P.

(57) ABSTRACT

An information handling system having a plurality of modular servers and input-output (I/O) modules use virtual bridge switches to couple any of the plurality of modular servers to any of the I/O modules. This allows the modular servers to have the I/O connectivity dictated by the computing environment rather than having a fixed I/O assignment. The modular servers and I/O modules may be coupled together through serial I/O interfaces. Input and output buffers may be used to manage data flow traffic and multiplexers may be used to steer data to the appropriate input and output buffers. Control logic may be used to control the multiplexers and a programmable I/O mapping table may be used to describe which modular servers are coupled to which I/O modules.

15 Claims, 5 Drawing Sheets

MULTI-HOST VIRTUAL BRIDGE INPUT-OUTPUT RESOURCE SWITCH

BACKGROUND OF THE INVENTION TECHNOLOGY

1. Field of the Invention

The present invention relates to information handling systems, and more specifically, to flexible distribution of input-output resources in a multi-host environment.

2. Background of the Related Technology

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems, e.g., computer, personal computer workstation, portable computer, computer server, print server, network router, network hub, network switch, storage area network disk array, RAID disk system and telecommunications switch.

Today's monolithic servers have dedicated input-output (I/O) subsystems with I/O slots (PCI) and embedded I/O devices. A typical server topology, show in FIG. 1, comprises one or more CPUs interconnected by a front side bus to which is attached a "north bridge." The north bridge functions as interfaces to both memory and I/O bridge interfaces, the latter through an I/O interconnect means that is often proprietary. The I/O bridge interfaces in turn are coupled to industry standard I/O buses such as PCI to which I/O cards are attached to generate standard network and storage connections such as Ethernet and Fibre Channel. The I/O resources (cards and embedded I/O) within the chassis are fixed and dedicated to the associated server.

FIG. 2 depicts servers using new standard serial I/O technologies such as PCI EXPRESS™ (a pending ITU trademark application registration by PCI SIG CORPORATION OREGON 5440 SW Westgate Drive, Suite 217, Portland Oreg. 97221). With the newer high speed serial I/O technologies it becomes practical to incorporate the I/O bridge functionality in the north bridge and provide direct connections to I/O slots, devices, or modules.

FIG. 3 depicts a fixed I/O per server paradigm using modular information handling system servers. Modular or blade information handling systems may have multiple servers contained within a single chassis or frame, with each server having some amount of dedicated I/O. This I/O may comprise one or more embedded devices such as an Ethernet controller and/or I/O slots, and the I/O interface may be a serial technology such as PCI EXPRESS™.

When multiple servers are deployed in a single chassis or frame, the I/O subsystems for each server typically remain in a fixed configuration associated only with the respective server and with no flexibility to redistribute the I/O resources (e.g., PCI slots or devices) in accordance with the needs of each server in the chassis. Allocating and sharing I/O resources between servers, generally, have been based on networking paradigms with sophisticated software stacks for supporting Ethernet running TCP/IP.

Therefore, a problem exists, and a solution is required for improving on how an information handling system of a multi-server environment having multiple I/O resources may allocate these I/O resources to any of the servers as the operational environment dictates, and in a manner that is software compatible with industry standard I/O subsystems, and current software operating systems.

SUMMARY OF THE INVENTION

The present invention remedies the shortcomings of the present technologies by providing a plurality of I/O resources in a multi-server environment, wherein the plurality of I/O resources may be allocated to any of the servers as the operational environment dictates, in a manner that is software compatible with industry standard I/O subsystems and current software operating systems. The present invention may allocate PCI-based or similar I/O subsystem resources to each connected host server via switches that behave like multiple I/O bridges.

This invention, made more practical for implementation by low pin count serial I/O technology, e.g., PCI EXPRESS™, enables the fixed and dedicated I/O resources from multiple servers to be used as a pool of I/O resources which can be statically allocated to server nodes as the computing environment dictates. The invention incorporates an I/O switch that connects to multiple hosts (CPU, memory, and native I/O) and multiple I/O modules (slots, devices, etc.), e.g., similar to a network switch. However, unlike a network switch, the I/O switch actually functions as one or more I/O bridges which connect any server CPU/memory module to any of the attached I/O modules, with the restriction that each I/O module have one and only one logical host connection. By assuming the behavior of I/O bridge interfaces, the switch allows configurable I/O resources while preserving the single host legacy I/O model, thus maintaining compatibility to existing operating systems and applications. For example, if the serial buses are implemented as PCI EXPRESS™ links, then the resulting topology behaves in the same fashion as a standard PCI I/O subsystem.

The present invention is directed to an information handling system having a multi-host virtual bridge input-output switch, said information handling system comprises: a plurality of server modules, each of said plurality of server modules having at least one central processing unit (CPU), memory and a bridge having at least one server input-output (I/O) port, wherein the bridge couples the CPU to the memory and the CPU to the at least one server I/O port; a plurality of input-output (I/O) modules, each of said plurality of input-output modules having a module I/O port; and at least one input-output (I/O) switch, said at least one I/O switch coupled to each of the at least one server I/O ports and to each of the module I/O ports, wherein said at least one I/O switch couples selected ones of the at least one server I/O ports to selected ones of the module I/O ports. The bridge may couple the memory to the at least one server I/O port. The information handling system may further comprise at least one native input-output (I/O) device in at least one of said plurality of server modules. The at least one server I/O port may be a serial port. The module I/O port may be a serial port. The at least one I/O switch may comprise: a plurality of input buffers; a plurality of output buffers; a plurality of multiplexers, wherein said plurality of input buffers and said plurality of output buffers are coupled to said plurality of multiplexers; and control logic for controlling said plurality of multiplexers, wherein said plurality of multiplexers determine which ones of said plurality of input buffers are coupled to which ones of said plurality of output buffers. A one of said input buffers and a one of said output buffers may be coupled to each server I/O port and each module I/O port. A mapping table may be coupled to said control logic, said mapping table storing which ones of said plurality of input buffers are coupled to which ones of said plurality of output buffers. Initialization logic may be used for initializing said control logic and said mapping table.

The present invention is also directed to an input-output (I/O) switch for an information handling system, said I/O switch comprises: a plurality of server I/O ports, each of said plurality of server I/O ports having an input buffer and an output buffer; a plurality of module I/O ports, each of said plurality of module I/O ports having an input buffer and an output buffer; a plurality of multiplexers, wherein the input buffers and the output buffers are coupled to said plurality of multiplexers; and control logic for controlling said plurality of multiplexers, wherein said plurality of multiplexers determine which of the input buffers are coupled to which of the output buffers. The I/O switch further comprising a mapping table coupled to said control logic, said mapping table storing which of the input buffers are coupled to which of the output buffers. The server I/O port may be a serial I/O port. The server I/O port may be a serial PCI I/O port, e.g., PCI EXPRESS™. The module I/O port may be a serial I/O port. The module I/O port may be a serial PCI I/O port, e.g., PCI EXPRESS™.

The present invention is further directed to a method for coupling a plurality of server modules to a plurality of input-output (I/O) modules in an information handling system, said method comprises the steps of: providing a plurality of server modules, each of the plurality of server modules having at least one central processing unit (CPU), memory and a bridge having at least one server input-output (I/O) port, wherein the bridge couples the CPU to the memory and the CPU to the at least one server I/O port; providing a plurality of input-output (I/O) modules, each of the plurality of input-output modules having a module I/O port; and coupling the at least one server I/O ports to respective ones of the module I/O ports. The method further comprising the step of mapping which of the at least one server I/O ports are coupled to which of the module I/O input ports. The method further comprising the step of initializing which of the at least one server I/O ports are coupled to which of the module I/O input ports. Wherein the step of initializing may be performed though a user interface.

A technical advantage of the present invention is sharing of I/O subsystems. Another technical advantage is compatibility with existing software operating systems and applications software. Other technical advantages should be apparent to one of ordinary skill in the art in view of what has been disclosed herein.

BRIEF DESCRIPTION OF THE DRAWINGS

A more complete understanding of the present disclosure and advantages thereof may be acquired by referring to the following description taken in conjunction with the accompanying drawings wherein.

Figure 1:
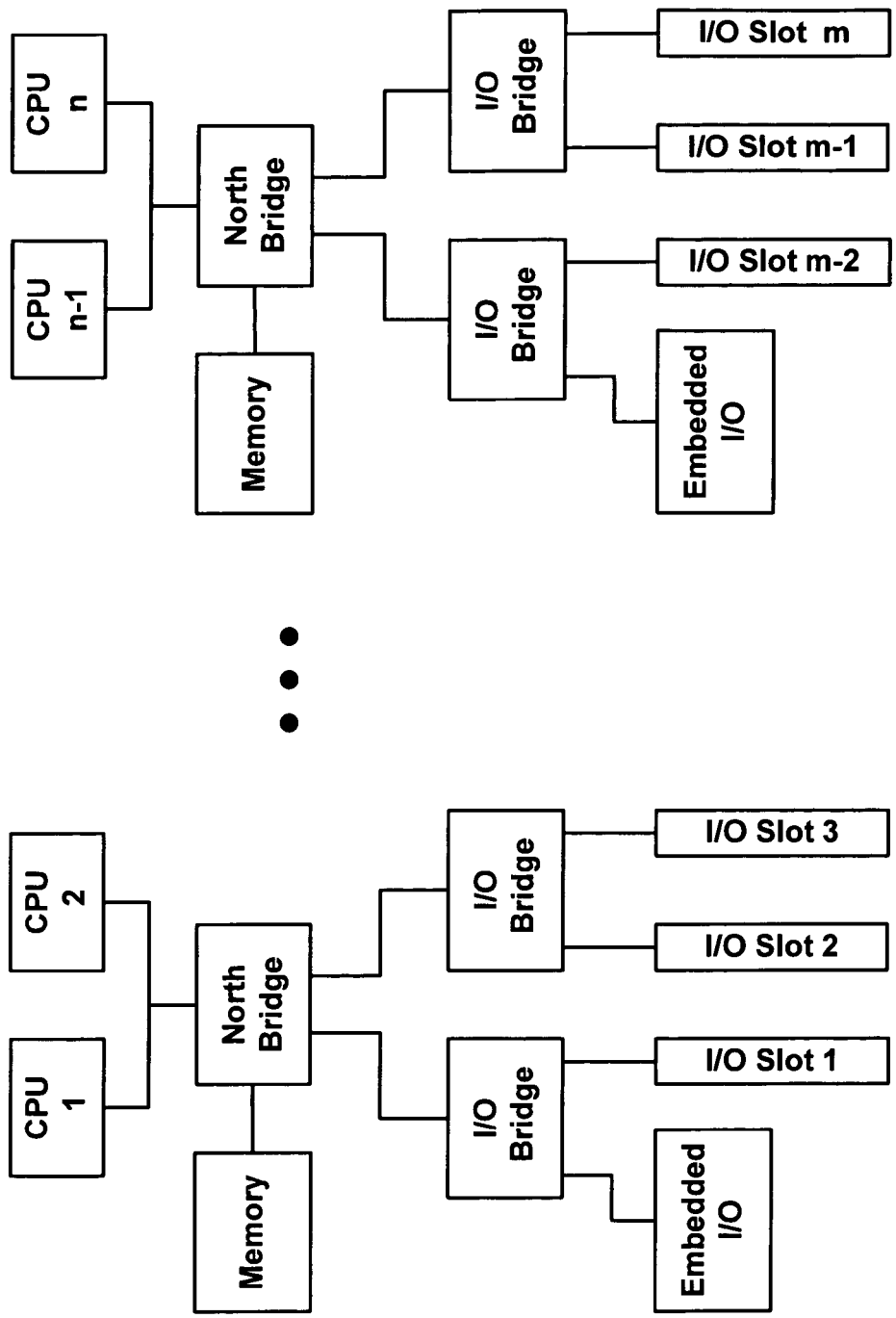
FIG. 1 is a schematic block diagram of a prior art plurality of servers in an information handling system.
Figure 2:
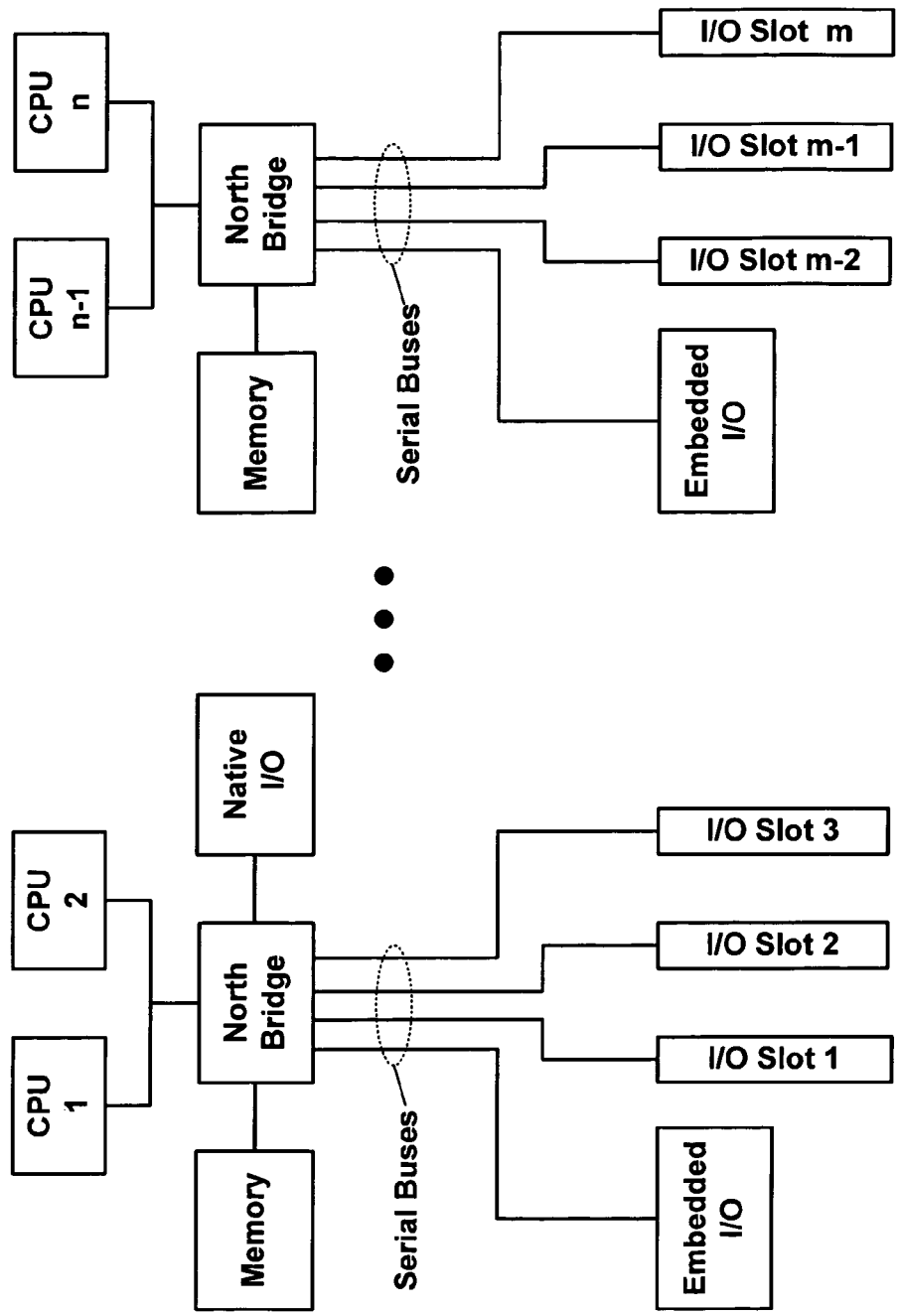
FIG. 2 is a schematic block diagram of a prior art plurality of servers with fixed input-output that are coupled to respective ones of the plurality of servers with high speed serial interfaces.
Figure 3:
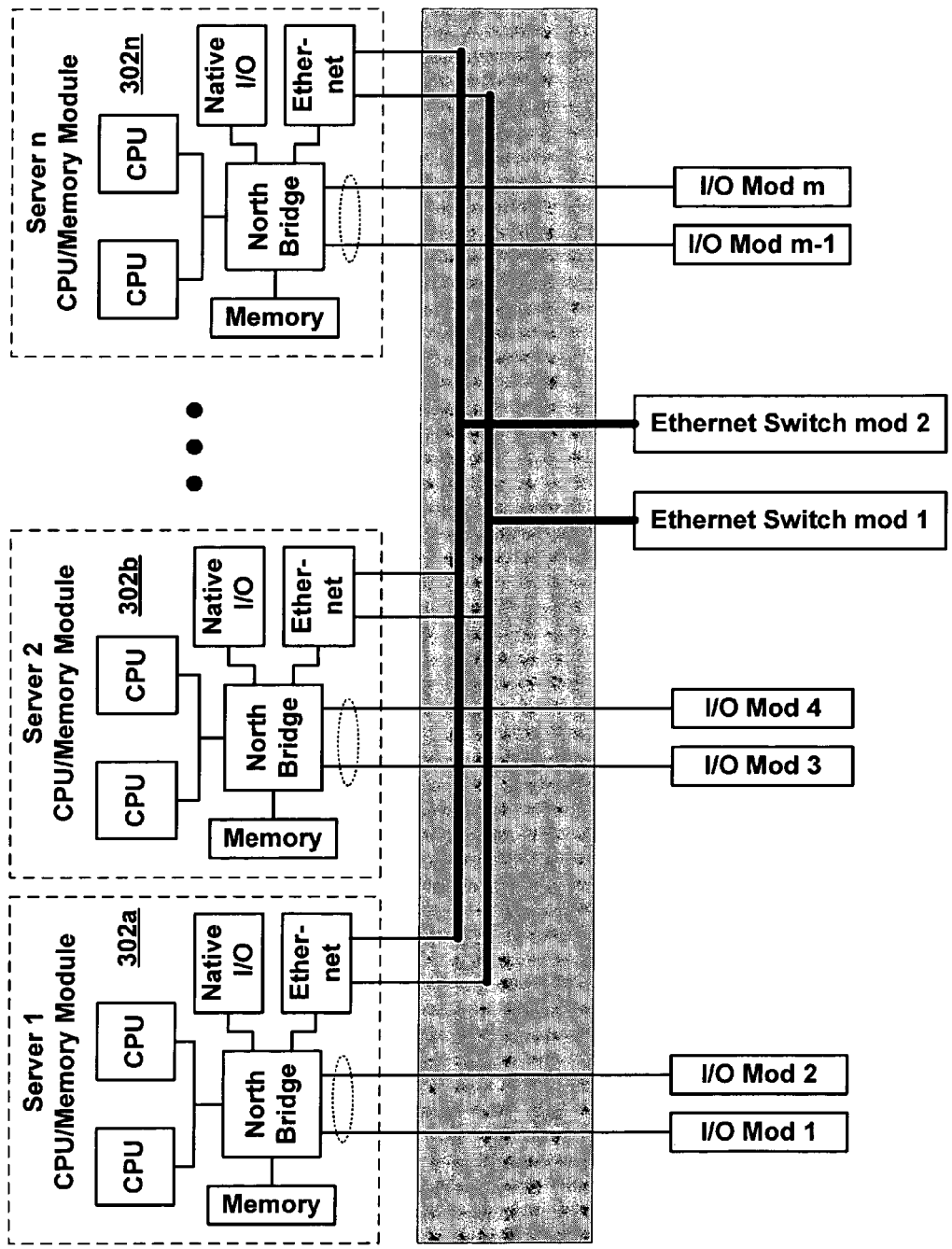
FIG. 3 is a schematic block diagram of a prior art plurality of modular servers with fixed input-output that are coupled to respective ones of the plurality of modular servers with high speed serial interfaces.

The present invention may be susceptible to various modifications and alternative forms. Specific exemplary embodiments thereof are shown by way of example in the drawing and are described herein in detail. It should be understood, however, that the description set forth herein of specific embodiments is not intended to limit the present invention to the particular forms disclosed. Rather, all modifications, alternatives, and equivalents falling within the spirit and scope of the invention as defined by the appended claims are intended to be covered.

DETAILED DESCRIPTION OF SPECIFIC EMBODIMENTS

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to the drawings, the details of exemplary embodiments of the present invention are schematically illustrated. Like elements in the drawings will be represented by like numbers, and similar elements will be represented by like numbers with a different lower case letter suffix.

Figure 4:
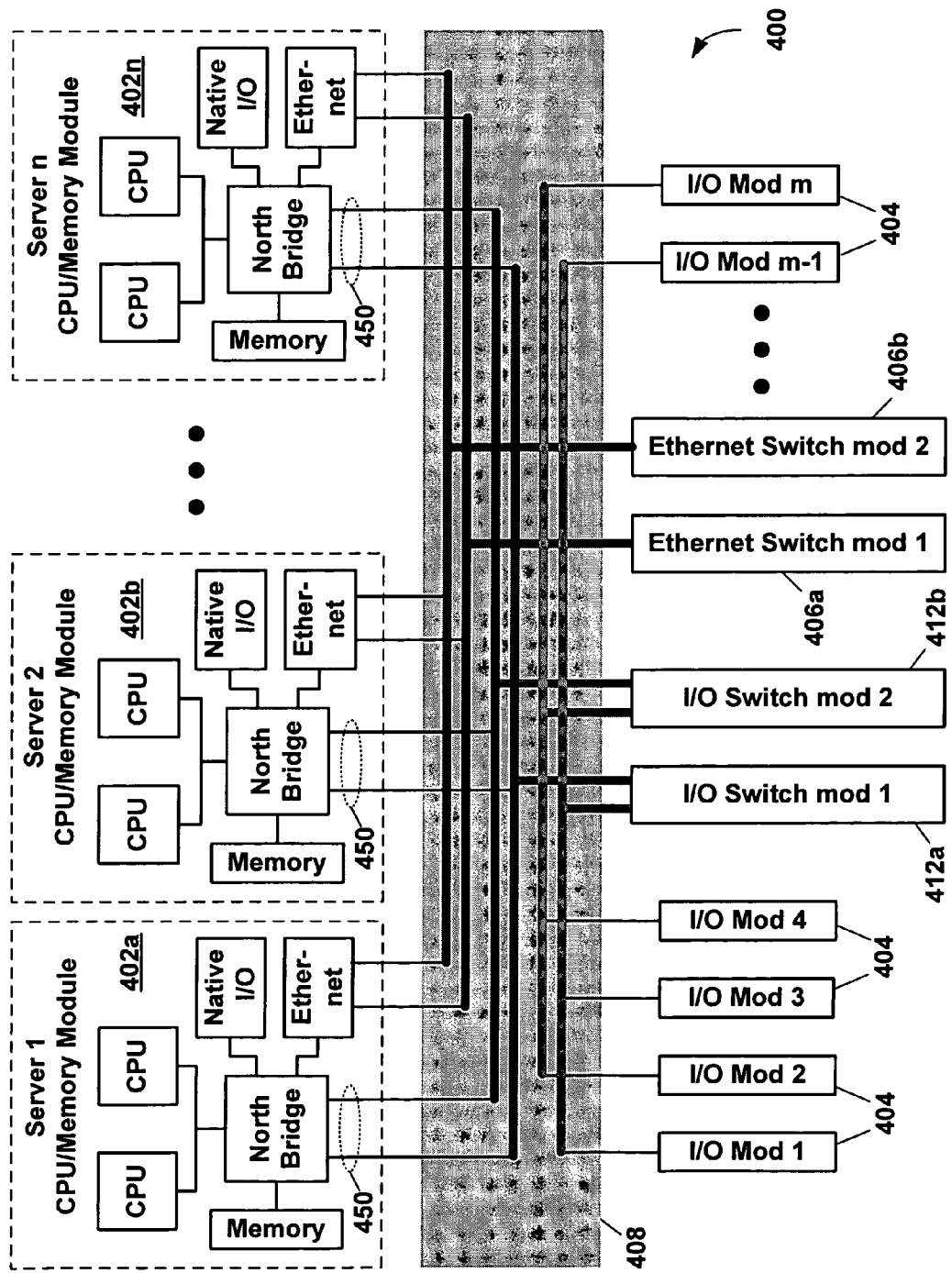
FIG. 4 is a schematic block diagram of an information handling system comprising a plurality of modular servers with configurable input-output that may be coupled to any of the plurality of modular servers through virtual bridge input-output switches, according to an exemplary embodiment of the present invention.

Referring to FIG. 4, depicted is a schematic block diagram of an information handling system comprising a plurality of modular servers with configurable input-output (I/O) that may be coupled to any of the plurality of modular servers through virtual bridge input-output switches, according to an exemplary embodiment of the present invention. The information handling system is generally represented by the numeral 400. Each of the plurality of modular servers comprises a CPU/memory module 402, each CPU/memory module 402 defining a specific server. Also included in each CPU/memory module 402 may be at least one CPU, a north bridge, memory, Ethernet controller and native I/O, e.g., USB, serial, keyboard, video, mouse, etc. The north bridge also has at least one I/O port 450, e.g., PCI EXPRESS™. It is contemplated and within the scope of the present invention that the north bridge may be integral with the CPU, e.g., AND OPTERON™ processor (a pending ITU trademark application registration by Advanced Micro Devices, Inc., One AMD Place, P.O. Box 3453, Sunnyvale, Calif. 94088).

Each of the CPU/memory modules 402 may be coupled to (e.g., plugged into) a passive midplane 408, which provides connections, for example, to two virtual bridge I/O switch modules 412 as well as redundant shared Ethernet switches 406. It is contemplated and within the scope of the present invention that a greater or fewer number of virtual bridge I/O switch modules 412 and/or redundant shared Ethernet switches 406 may be utilized with the present invention.

For example, but not limited to, I/O switch module 1 (412a) may control host connections to I/O modules 1, 3 and m-1 (404). I/O switch module 2 (412b) may control host connections to I/O modules 2, 4, and m (404). The I/O switch modules 412 may be configured to connect a CPU/memory module 402 to any number of I/O modules 404. For example, CPU/memory module 1 (402a) may be logically connected to I/O modules 1, 2 and 3 (404) through the I/O switches 412a and 412b. CPU/memory module 2 (402b) may be logically connected to I/O modules 4 and m (404) through the I/O switch 412a, etc. To the information handling system operating system and pertinent software applications, the I/O switches 412 appear as I/O bridges, creating one or more down-stream I/O interfaces and unique logical bus numbers. With a single I/O switch module 412, there may be multiple instantiations of independent bridges. The result is that I/O resources can be statically assigned in a manner that best matches the computing environment designated for each server. Transaction processing intensive servers may be assigned a relatively large number of I/O resources whereas a numerically intensive compute server may be assigned fewer I/O resources.

Figure 5:
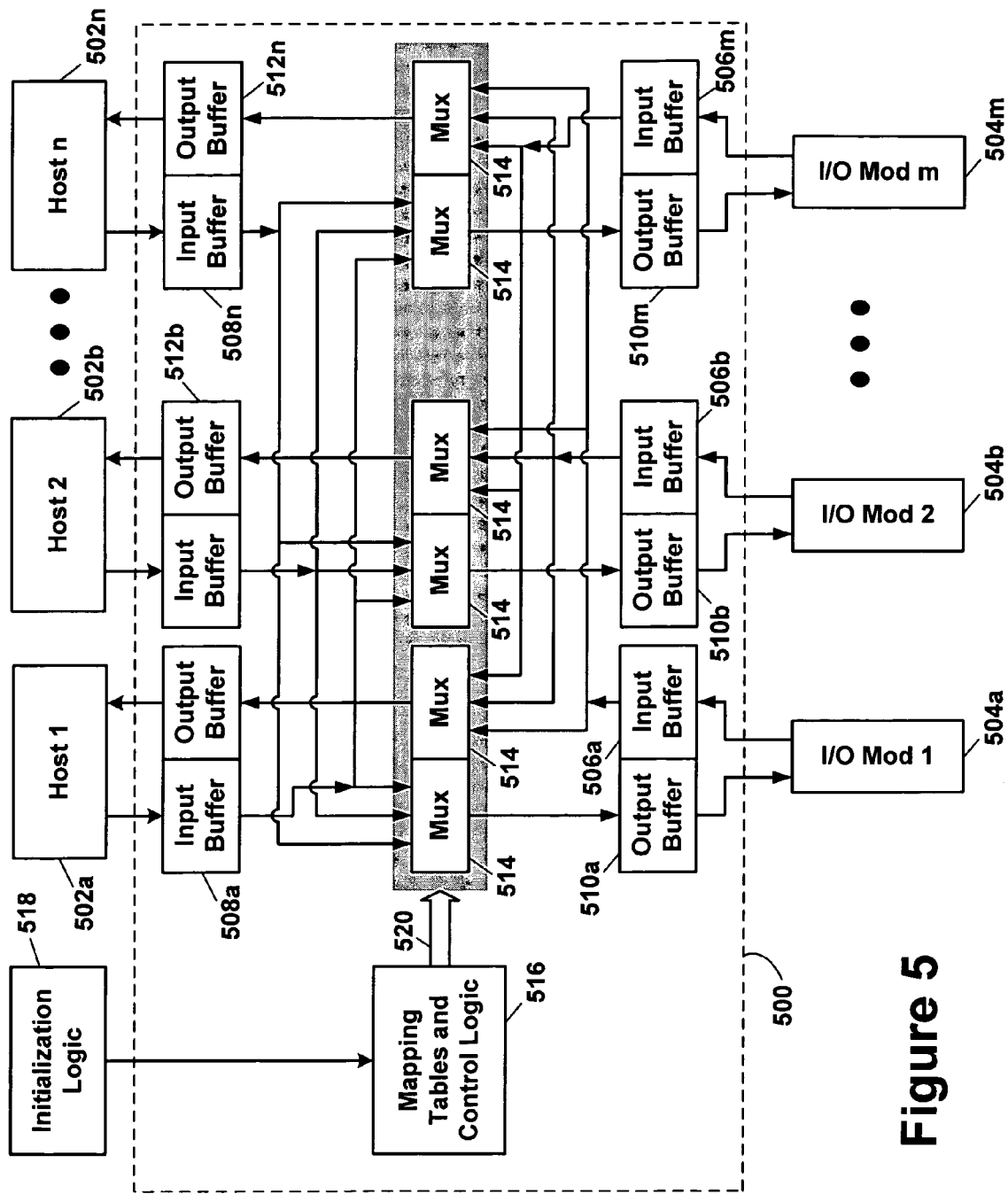
FIG. 5 is a more detailed schematic block diagram of the virtual bridge input-output switches of FIG. 4, according to the exemplary embodiment of the present invention.

Referring now to FIG. 5, depicted is a more detailed schematic block diagram of the virtual bridge input-output switches 412 of FIG. 4, according to the exemplary embodiment of the present invention. A logical switch fabric, generally represented by the numeral 500, has a plurality of host connections 502, with each host connection 502 being coupled to a CPU/memory module 402 through its north bridge via the at least one I/O port 450 (FIG. 4). A plurality of I/O module connections 504, e.g., modules being Ethernet, Fibre Channel, RAID controller, etc., are coupled to the logical switch fabric 500. The host connections 502 and I/O module connections 504 are depicted in FIG. 5 as serial interfaces, e.g., PCI EXPRESS™. It is contemplated and within the scope of the present invention that parallel host and/or I/O interfaces may be used with equal success. As a further advantage, however, the serial interfaces require far fewer signals and thus are a more practical and cost effective implementation when coupling together a number of host connections 502 and I/O module connections 504 through the logical switch fabric 500.

Input buffers 506 and 508, and output data buffers 510 and 512 may be used to manage data flow traffic. Multiplexers 514 may be used to steer data to the appropriate input buffers 506 and 508, and output buffers 510 and 512 under control, for example, of control logic 516, where the control logic 516 may have programmable I/O mapping tables. The programmable mapping tables describe which I/O modules (connections 504) are connected to which hosts (connections 502). This information may then be translated to multiplexer selection logic control signals 520 to implement the appropriate logical connections with the multiplexers 514 of the logical switch fabric 500.

Initialization of the logical switch fabric 500 (multiplexers 514, input buffers 506 and 508, output buffers 510 and 512, and the mapping tables of the control logic 516 may be accomplished by external initialization logic 518. The external initialization logic 518 may communicate with the control logic 516 over what would typically be a low pin-count interface such as I²C, JTAG, etc. Thus a chassis supervisor or service processor may access the logical switch fabric 500 through a user interface so that the administrator can allocate I/O resources appropriately. Once the host-to-I/O module mappings are made, each server can boot its operating system (OS) with its designated I/O resources with the resultant topology appearing like a conventional I/O subsystem.

The invention, therefore, is well adapted to carry out the objects and to attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alteration, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. An information handling system having a multi-host virtual bridge input-output resource switch, said system comprising:

a plurality of server modules, each of said plurality of server modules having at least one central processing unit (CPU), memory and at least one server input-output (I/O) port;

a plurality of input-output (I/O) modules, each of said plurality of input-output modules having a module I/O port adapted for coupling to any one of the at least one server I/O port; and at least one input-output (I/O) switch comprising:

a plurality of input buffers, wherein a one of the plurality of input buffers is coupled to each of the at least one server I/O port of each of the plurality of server modules and another one of the plurality of input buffers is coupled to the module I/O port of each of the plurality of I/O modules;

a plurality of output buffers, wherein a one of the plurality of output buffers is coupled to each of the at least one server I/O port of each one of the plurality of server modules and another one of the plurality of output buffers is coupled to the module I/O port of each of the plurality of I/O modules;

a plurality of multiplexers, wherein said plurality of input buffers and said plurality of output buffers are coupled to said plurality of multiplexers; and control logic for controlling said plurality of multiplexers, wherein said plurality of multiplexers determine which ones of said plurality of input buffers are coupled to which ones of said plurality of output buffers;

said at least one I/O switch is coupled to each of the at least one server I/O ports and to each of the module I/O ports, wherein said at least one I/O switch statically couples selected ones of the at least one server I/O ports to selected ones of the module I/O ports so that each of the plurality of server modules will boot its operating system and recognize the statically coupled ones of the module I/O ports.

2. The information handling system according to claim 1, further comprising a bridge for coupling the CPU to the memory and to the at least one server I/O port.

3. The information handling system according to claim 1, further comprising at least one native input-output (I/O) device in at least one of said plurality of server modules.

4. The information handling system according to claim 3, wherein the at least one native I/O device is an interface selected from the group consisting of USB, serial, keyboard, video and mouse interfaces.

5. The information handling system according to claim 1, further comprising an Ethernet controller in at least one of said plurality of server modules.

6. The information handling system according to claim 1, wherein the at least one server I/O port is a serial port.

7. The information handling system according to claim 1, wherein the module I/O port is a serial port.

8. The information handling system according to claim 1, wherein the at least one server I/O port is a serial PCI I/O port.

9. The information handling system according to claim 1, wherein the module I/O port is a serial PCI I/O port.

10. The information handling system according to claim 1, further comprising a mapping table coupled to said control logic, said mapping table storing which ones of said plurality of input buffers are coupled to which ones of said plurality of output buffers.

11. The information handling system according to claim 10, further comprising initialization logic for initializing said control logic and said mapping table.

12. The information handling system according to claim 11, wherein said initialization logic is external from said at least one I/O switch.

13. The information handling system according to claim 12, wherein said initialization logic is coupled to said control logic with a low pin count interface.

14. The information handling system according to claim 13, wherein the low pin count interface is selected from the group consisting of $I^2C$ and JTAG.

15. The information handling system according to claim 1, wherein said at least one I/O switch is accessed through a user interface.

* * * * *